July 28, 1936.  E. C. HORTON  2,049,010
MOTOR VEHICLE
Filed April 26, 1935
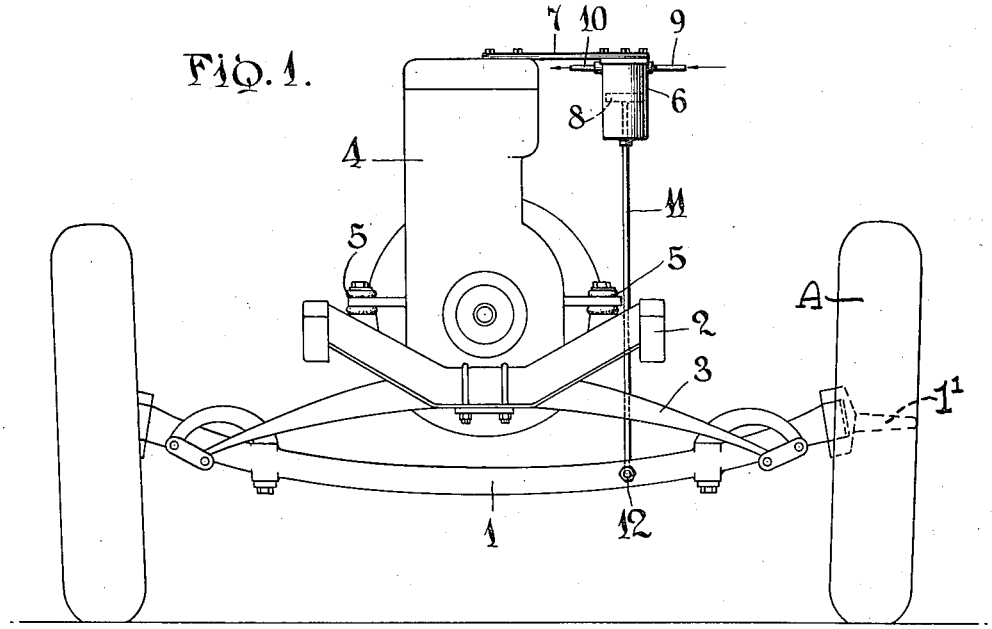
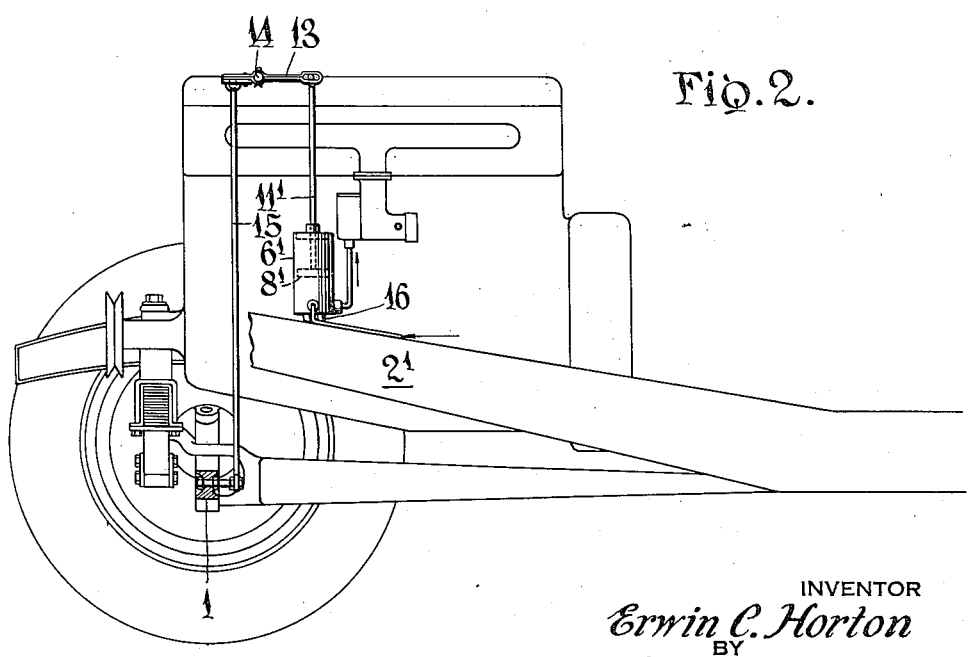
INVENTOR
Erwin C. Horton
BY
Beau, Brooks, Buckley & Beau.
ATTORNEYS Patented July 28, 1936

2,049,010

UNITED STATES PATENT OFFICE 2,049,010

MOTOR VEHICLE

Erwin C. Horton, Hamburg, N. Y., assignor to Trico Products Corporation, Buffalo, N. Y.

Application April 26, 1935, Serial No. 18,479

8 Claims. (Cl. 180—54)

This invention relates to a motor vehicle and has particular reference to an accessory system therefor.

It has heretofore been proposed to utilize the relative movement between parts of a vehicle chassis to operate a pump as a source of fluid pressure supply. However, this relative movement is quite restricted and in itself has not been given to any practical application. Furthermore, because of their design and construction, the proposed means have been unreliable and therefore unsatisfactory. For instance, when a resiliently mounted engine is idling, the relative movement between it and the body frame is emphasized to a considerable degree. However, when the engine is pulling or propelling the vehicle, the vibratory movement of the engine is reduced to a minimum and is insufficient to operate an accessory. Therefore, the accessory will have an unreliable source of power and because of this fact it will fail to operate at times when its functioning is desired.

The present invention has for its object to provide means by which this relative movement may be utilized to advantage in satisfactorily providing sufficient power to operate an accessory system in a practical manner and for the greatest efficiency.

In the drawing Fig. 1 is a diagrammatical view showing a motor vehicle chassis in front elevation and equipped with the present invention in one embodiment.

Fig. 2 is a fragmentary side elevation of a chassis equipped with a modified embodiment of the present invention.

Referring more particularly to the drawing, the numeral 1 designates one of the axles of a motor vehicle having the wheels A mounted on the spindles 1', 2 the body frame thereof which is supported above the axle by means of the spring 3, and 4 the power plant of the vehicle, such power plant being resiliently supported on the frame 2 by rubber blocks 5, or in any other suitable mounting, to avoid excessive transmission of body vibration from the engine to the occupants of the vehicle.

In an engine mounting of this type the torque development is accentuated to a considerable degree in the body vibration of the engine when the latter is idling or unclutched from the driving wheels of the vehicle. This vibration is laterally of the vehicle or about the axis of the engine crank shaft, and, therefore, the motion at the top or in the head of the engine will be the greatest. Therefore, it is preferable to connect the accessory to the head.

To this end, one of the essential elements of the accessory, such as a pump, is attached to the head of the engine. In the particular showing of the drawing, the pump cylinder 6 is attached to the head as by means of a bracket 7. This connection or attachment is preferably a flexible one so as to permit proper alignment of the cylinder and its piston being maintained at all times. The bracket 7 is therefore illustrated as being in the form of a leaf springlike structure, although any other suitable mounting may be utilized for this purpose. With this mounting the cylinder will be reciprocated by the vibratory motion of the engine and where the piston is mounted on an adjacent part of the chassis, unaffected by such vibratory motion, the cylinder will move relative to the piston and produce a pumping action. Fluid will thus enter the inlet side 9 of the pump and be expelled through the outlet side 10, suitable check valves, not shown, being obviously placed in the pump line to maintain unidirectional flow of fluid therethrough.

When the engine is clutched in driving relation to the rear or driving wheels of the vehicle, the vibratory motion of the engine is reduced. Consequently as the vehicle is traveling over the road there may be practically no pumping action resulting from the engine vibration. However, during this road travel there is considerable vibration set up between the axle 1 and the body frame 2 as the spring 3 yields to uneven road surfaces. To take advantage of this relative movement between the axle and the body frame the piston rod 11 is connected to the axle 1 at 12 and therefore as the frame rises and falls, with respect to the axle the piston 8 will be vertically reciprocated to continue the pumping action which may have been temporarily interrupted by reason of the coupling of the engine to the driving wheels of the vehicle.

It is, therefore, apparent that the two sources of vibration will cooperate as they alternate in their operation of the pump, and should the engine be permitted to idle during vehicular movement, such as when coasting, the increased engine vibration will serve to amplify the pumping action and increase the fluid output.

In Fig. 2, a further embodiment of the invention has been illustrated for greater fluid displacement of the pump. To this end the pumping cylinder 6' may be mounted on the body frame 2', and the piston rod 11' connected to the axle 1 by a system of levers to increase the effective movement of the piston 8'. Accordingly a lever 13 is mounted on the engine head by a fulcrum bracket 14, the longer arm of the lever being connected to the piston rod 11' while the shorter arm is connected by a link 15 to the axle. The lever 13 may be formed after the manner of a leaf spring to provide sufficient flexibility against excessive piston strokes, as well as to maintain proper alignment of the piston with its cylinder. For this latter purpose the base 16 of the cylinder 6' may be permitted to rock to provide the necessary flexibility in a cylinder mounting.

The operation of the embodiment depicted in Fig. 2 is believed to be obvious since vibratory motion of the engine head will obviously serve to reciprocate the piston 8' about the fulcrum point at the upper end of the link 15. Vibration incidental to the travel of the vehicle will oscillate the lever 13 about the fulcrum point 14 to effect pumping operation. Joint action of the two sources of vibration will serve to emphasize the piston movement to effect greater fluid displacement.

The term "axle" is used in the appended claims whether or not the axle extends entirely from one side of the vehicle to the other, since the inventive principles herein involved are applicable to other physical embodiments without departing from the scope and spirit of the invention claimed. For instance, the wheel spindles may be mounted independently of each other, the individual spindle assembly including also individual springs and other parts for giving the vehicle the desired cushioning support.

What is claimed is:

1. A motor vehicle having an axle, a body frame spring-supported thereon for relative movement, a power plant resiliently supported on the frame for relative movement, and an accessory having two parts movable relative to each other for its actuation, one of said parts being connected to the power plant and the other of said parts being connected to the axle and operable by either or both of the relative movements set up between the axle and the body frame, on the one hand, and between the latter and the power plant, on the other hand.

2. A motor vehicle having an axle, a body frame spring-supported thereon for relative movement, a power plant resiliently supported on the frame for independent relative movement, a pump having a cylinder part and a piston part, one of said parts being connected to the power plant for being vibrated thereby and the other of said parts being connected to the axle for being vibrated thereby.

3. A motor vehicle having an axle, a body frame spring supported thereon for vibratory movement, a power plant resiliently supported on the frame for independent vibratory movement, a pump having a cylinder part and a piston part, and means operatively connecting one of said parts to the axle and the other of said parts to the power plant for utilizing either one as well as both of the vibratory movements for imparting relative movement to said pump parts for actuating the pump.

4. A motor vehicle having a wheel designed for rolling upon the surface of a highway, a spindle supported by the wheel and defining the axis of rotation of said wheel, a body frame spring-supported on the spindle for relative movement thereto, a power plant resiliently supported on the frame for independent relative movement, a pump having a cylinder part and a piston part, one of said parts being connected to the power plant for being vibrated thereby and the other of said parts being connected to the spindle assembly for being vibrated thereby.

5. A motor vehicle having a wheel designed for rolling upon the surface of a highway, a spindle supported by the wheel and defining the axis of rotation of said wheel, a body frame spring-supported on the spindle for relative movement thereto, a power plant resiliently supported on the frame for independent relative movement, and an accessory having two parts movable relative to each other, one part being connected to the spindle assembly and the other part being connected to the power plant whereby said accessory parts will be actuated by either or both of the relative movements set up between the spindle assembly and the body frame on the one hand and between the latter and the power plant on the other hand.

6. A motor vehicle having an axle element, a body element spring supported thereon for relative movement, a power plant element resiliently supported on the body element for independent relative movement, a pump having a cylinder part and a piston part, one of said parts being mounted on one of the aforesaid elements and the other of said parts being connected to the other two of said elements through a system of levers for utilizing the movements set up either jointly or solely in the operation of said pump.

7. A motor vehicle having an axle, a body frame spring supported thereon, a power plant resiliently supported on the frame, an accessory having relatively movable operating parts, and means operatively connecting one of said accessory parts to the axle and the other of said accessory parts to the power plant for utilizing the combined relative movements between the axle, frame and power plant in the operation of said accessory.

8. A motor vehicle having an axle, a body frame spring supported thereon, a power plant resiliently supported on the frame, a lever fulcrumed on one of the aforesaid three elements, an accessory mounted on one of the remaining two elements and having a movable operating part connected to said lever, and means connecting the other of said two remaining elements to said movable operating part whereby said accessory will be operated by and during relative movements first between the axle and body frame, secondly between the latter and power plant, and thirdly by the combination of such movements.

ERWIN C. HORTON.